(12) United States Patent
Gill et al.

(10) Patent No.: US 9,261,389 B2
(45) Date of Patent: Feb. 16, 2016

(54) ULTRASONIC FLOWMETER

(71) Applicant: Gill Corporate Limited, New Milton (GB)

(72) Inventors: Michael John Gill, Beaulieu (GB); Samuel William Birtwell, Lymington (GB); Oliver Stewart Blacklock, Lymington (GB)

(73) Assignee: Gill Corporate Limited (GB)

( * ) Notice: Subject to any disclaimer, the term of this patent is extended or adjusted under 35 U.S.C. 154(b) by 46 days.

(21) Appl. No.: 14/328,764

(22) Filed: Jul. 11, 2014

(65) Prior Publication Data

US 2015/0013472 A1    Jan. 15, 2015

(30) Foreign Application Priority Data

Jul. 12, 2013 (GB) .................................. 1312558.8
Dec. 11, 2013 (GB) .................................. 1321921.7

(51) Int. Cl.
*G01F 1/66* (2006.01)

(52) U.S. Cl.
CPC .................................. *G01F 1/662* (2013.01)

(58) Field of Classification Search
USPC ................ 73/861.27, 861.29, 861.28, 861.31
See application file for complete search history.

(56) References Cited

U.S. PATENT DOCUMENTS

| 4,365,518 | A | * | 12/1982 | Zacharias, Jr. | ............ | G01F 1/66 |
| | | | | | | 73/861.28 |
| 5,458,004 | A | * | 10/1995 | van der Pol | ............. | G01F 1/667 |
| | | | | | | 73/861.29 |
| 2007/0068254 | A1 | | 3/2007 | Anstett et al. | | |
| 2007/0227263 | A1 | * | 10/2007 | Fukano | ................... | G01F 1/662 |
| | | | | | | 73/861.27 |
| 2011/0132103 | A1 | | 6/2011 | Gottlieb | | |

FOREIGN PATENT DOCUMENTS

| JP | 2006337059 A | 12/2006 |
| WO | 9710490 A1 | 3/1997 |

* cited by examiner

*Primary Examiner* — Jewel V Thompson
(74) *Attorney, Agent, or Firm* — Daniel A. Tallitsch; Baker & McKenzie LLP

(57) ABSTRACT

An ultrasonic flowmeter comprising an elongate duct through which fluid flows when the flowmeter is in use. Ultrasonic transducers are arranged respectively to transmit and receive ultrasonic pulses propagated through such fluid when the flowmeter is in use. Electronic circuitry is connected to the transducers to provide a measure of the time delay between emission of an electronic pulse from one of the transducers and reception of the pulse by the other of the transducers. The circuitry is constructed to enable an output to be provided which is dependent upon that delay and which is indicative of the rate of flow of fluid through the duct. The transducers are located respectively at opposite ends of the duct and are arranged to transmit and receive ultrasonic pulses propagated through the fluid substantially parallel to the duct from one end thereof to the other. The transducers are provided with respective vibratory surfaces which transmit and/or receive ultrasound, which vibratory surfaces have a diameter which exceeds the cross-sectional diameter of the duct.

20 Claims, 4 Drawing Sheets

ULTRASONIC FLOWMETER

CROSS-REFERENCE TO RELATED APPLICATIONS

The present invention is directed to an ultra-sonic flowmeter, which claims priority to British Patent Application No. GB 1312558.8 filed on Jul. 2, 2013, and GB 1321921.7 filed on Dec. 11, 2013, both of which are incorporated herein by reference.

BACKGROUND

1. Field of the Invention

The present invention is directed to an ultrasonic flowmeter comprising an elongate duct through which fluid flows when the flowmeter is in use, ultrasonic transducers arranged respectively to transmit and receive ultrasonic pulses propagated through such fluid when the flowmeter is in use, and electronic circuitry connected to the transducers to provide a measure of the time delay between emission of an electronic pulse from one of the transducers and reception of the pulse by the other of the transducers, and constructed to enable an output to be provided which is dependent upon that delay and which is indicative of the rate of flow of fluid through the duct, in which the transducers are located respectively at opposite ends of the duct and are arranged to transmit and receive ultrasonic pulses propagated through the fluid substantially parallel to the duct from one end thereof to the other.

2. Description of the Invention

An example of such a flowmeter is illustrated and described in GB 2259571 A. Thus in that specification there is disclosed a fluid flow measurement system which includes two transducers which are located in a duct to provide a measuring path through a measuring tube. The transducers are switchable to allow each to be used for both transmission and reception and the speed of fluid passing through the measuring tube will be dependent on the difference in time periods for a signal from the transducers passing with or against the fluid flow, and including correction means for substantially eliminating transducer delay errors to ensure accuracy. The system may comprise a calibration mechanism employing an auxiliary transducer with its own ultrasonic paths. It allows accurate measurement of speed of sound values to be determined for the particular fluid flowing and the particular system parameters including transducer delay.

A disadvantage of such a construction is the spread of the transmitted ultrasonic pulse in such a manner that there is a relatively high dispersion of each pulse before it is received by the second transducer, thus impairing the accuracy of the flowmeter.

The present invention seeks to provide a remedy.

Accordingly the present invention is directed to an ultrasonic flowmeter having the construction set out in the opening paragraph of the present specification, characterised in that the transducers are provided with respective vibratory surfaces which transmit and/or receive ultrasound, which vibratory surfaces have a diameter which exceeds the cross-sectional diameter of the duct.

Both transducers may be isolated from fluid which flows through the flowmeter when the latter is in use.

This provides the advantage that the transducers are not subject to any corrosive effects from such fluid.

Such isolation may be effected by respective caps to which the transducers are acoustically coupled.

Fluid which flows through the flowmeter when it is in use may be in contact with that side of each cap which is further from the associated transducer, the transducers being in respective cavities filled with air or other gas or other low density material.

The thickness of the caps may be such as to optimise coupling between the transducers and such fluid.

The caps may be mounted in or on damping mountings to reduce signal degradation owing to ringing of the caps.

Both transducers may be constructed to both transmit and receive ultrasonic pulses, and the electronic circuitry may be such as to enable the flowmeter to operate by transmitting and receiving ultrasonic pulses which pass within the fluid from one transducer to the other in the direction of flow of fluid, and also in the opposite direction, and to enable the difference in transmission time between pulses transmitted in the direction of flow and those transmitted opposite to the direction of flow to be used to calculate the rate of flow of fluid through the duct.

This provides the advantage that substantially all the ultrasound transmitted and received by the transducers is propagated substantially parallel to the duct. This in turn reduces the amount of scattered ultrasound, and preserves the integrity of the ultrasound waves as they pass from one transducer to the other.

There may be a circular symmetry in the construction of the flowmeter at the transducers.

There may be a reflection symmetry in the construction of the flowmeter about a central transverse plane thereof.

The flowmeter may be provided with an input aperture and an output aperture through which fluid flows when the flowmeter is in use, the diameters of the input and output apertures being substantially equal, but being larger than the cross-sectional diameter of the duct.

This results in an increase in the speed of fluid flow in the duct relative to the speed it has when it passes into and out of the flowmeter, which in turn increases the accuracy of the measurement of fluid flow through the input and the output apertures.

The input and output apertures may be located laterally of the duct, between the ends of the duct, and the flowmeter may be provided with fluid-flow passageways from the inlet aperture to one end of the duct, and from the other end of the duct to the outlet aperture. This again reduces the amount of turbulence of the fluid within the flowmeter.

The flowmeter may be constructed so that the diameter of the duct is substantially five wavelengths of the ultrasound transmitted by the transducers or at least one of the transducers, being the wavelengths of the ultrasound as transmitted within the fluid the flow of which is to be measured. This enables the duct to act as an ultrasonic waveguide, facilitating directional propagation of the ultrasound. However, to effect this a suitable balance is required between on the one hand the absorption of ultrasonic waves that strike the material which defines the duct, so that reflection or scattering of such soundwaves does not unduly corrupt the ultrasonic pulse or wave packet travelling along the duct, and on the other hand sufficient reflection of ultrasonic waves from the material which defines the duct to ensure that the strength of the wave packet travelling along the duct is not unduly attenuated.

Thus the material which defines the duct may be such that it absorbs ultrasound, as transmitted by the transducers or at least one of the transducers, having an angle of incidence to the material which is less than a predetermined angle, but reflects such ultrasound having an angle of incidence to the material which is greater than a predetermined angle.

This again preserves the integrity of the wave packets of ultrasound as they pass through the fluid which flows through the flowmeter when the latter is in use.

The ratio of the length of the duct to its cross-section diameter is preferably in the range from 20 to 30, preferably about 23.

Preferably the duct is cylindrical and of uniform cross-section, although it may be defined by material the internal walls of which have a relief pattern to achieve the desired absorption/reflection properties of the walls of the duct.

Preferably the diameter of the duct is about 5.0 mm, and the spacing between the transducers is about 113 mm.

To this end the speed of sound through the material which defines the duct is preferably greater than the speed of sound through the fluid which flows through the flowmeter when the latter is in use, and the density of that material is preferably greater than the density of the fluid which flows through the flowmeter when the latter is in use. It is desirable that this remains so throughout the range of operating temperatures and fluid compositions.

The said material may comprise glass filled polytetrafluoroethylene (PTFE). This is able to withstand attack from fluids which may flow through the flowmeter, especially for example engine fuel such as petroleum or petroleum derivatives including diesel fuel. The glass content can be varied to tailor the acoustic impedance to a desired value.

The fluid which flows through the flowmeter when the latter is in use may comprise engine fuel.

The present invention extends to a method of measuring the flow of fluid using an ultrasonic flowmeter as set out in one or more of the preceding paragraphs relating to the present invention.

BRIEF DESCRIPTION OF THE DRAWINGS

Examples of an ultrasonic flowmeter embodying the present invention will now be described in greater detail with reference to the accompanying drawings, in which.

DETAILED DESCRIPTION OF THE DRAWINGS

Figure 1:
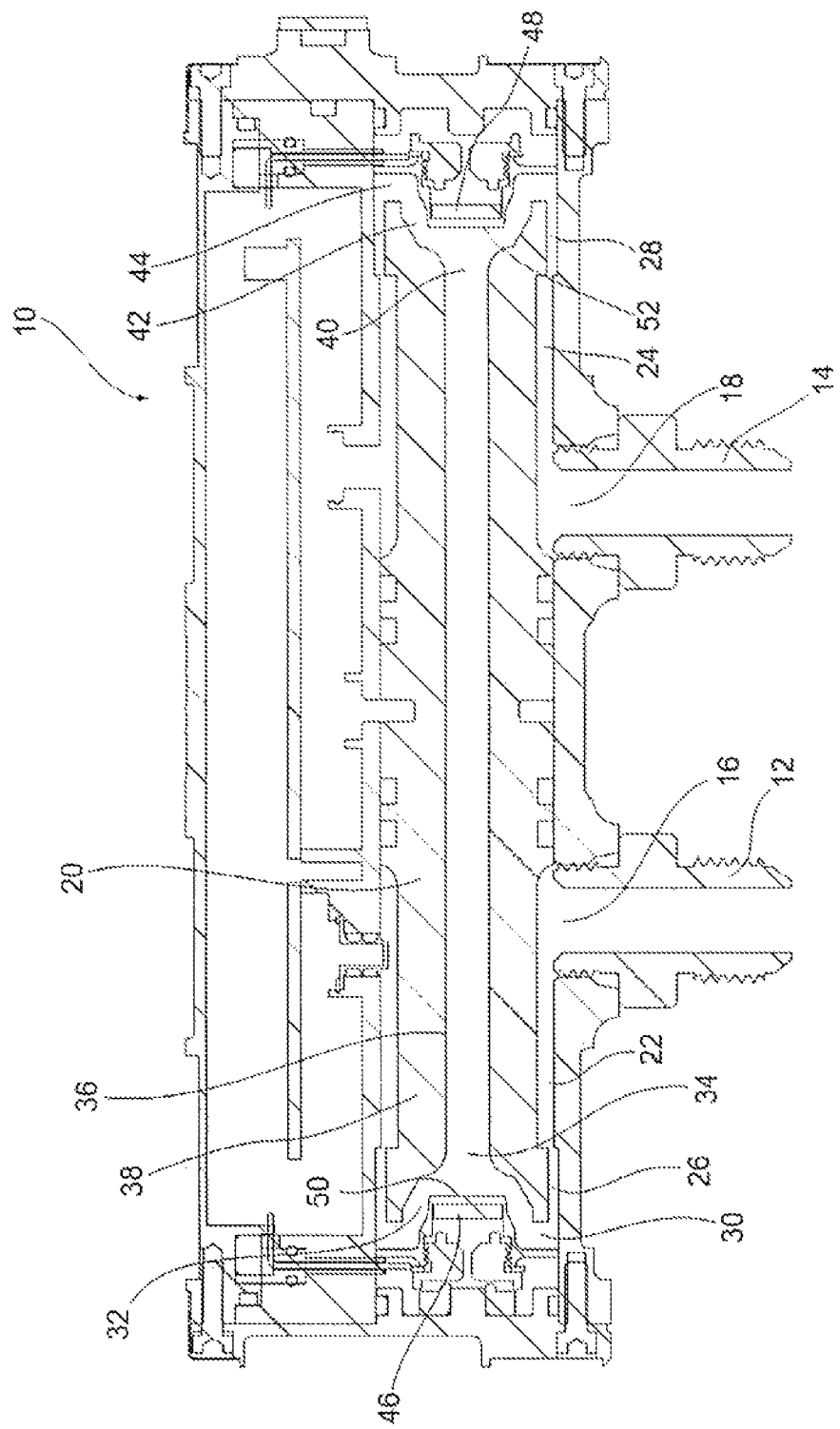
FIG. 1 is an axial sectional view of a first embodiment of a flowmeter made in accordance with the present invention.

The flowmeter 10 shown in FIG. 1 comprises a generally cylindrical inlet port 12 and a generally cylindrical output port 14. These provide respectively an inlet aperture 16 and an outlet aperture 18, both of which are generally circular and are of the same diameter.

The respective central axes of the inlet and outlet ports extend perpendicularly to a generally cylindrical block 20 of the flowmeter 10, and the ports 12 and 14 open out into respective upstream and downstream annular passageways 22 and 24 which are within the block 20 and are co-axial therewith. These passageways extend into further respective passageways 26 and 28 via respective constrictions to reduce turbulence within the fluid which flows through the flowmeter 10 when the latter is in use further downstream.

A radially extending passageway 30 extends from the annular passageway 26 to a generally conical void 32 which is in fluid communication with an end 34 of a generally cylindrical elongate duct 36 defined by a generally cylindrical block of glass filled PTFE 38.

The duct 36 extends from one end of the cylindrical block 20 to the other, and has flared ends.

The other end 40 of the duct 36 is in fluid communication with a corresponding generally conical void 42 which in turn is in fluid communication with the passageway 28 via a radially extending passageway 44.

The cross-sectional diameter of the duct 36, which is uniform in cross section throughout its length between its flared ends, is significantly less than the diameter of the inlet and outlet apertures 16 and 18.

A first piezoelectric ceramic ultrasonic transducer 46 is located within the void 32. A second piezoelectric ultrasonic ceramic transducer 48 is located within the void 42.

The transducer 46 has a generally planar circular vibratory surface 50 capable of generating and receiving ultrasonic vibrations. The diameter of the surface 50 is significantly greater than the cross-sectional diameter of the duct 36. The surface 50 faces the duct 36 and is orthogonal to that duct, and has a perpendicular central axis which is co-linear with the central longitudinal axis of the duct 36.

Correspondingly, the transducer 48 has a generally planar circular vibratory surface 52 capable of generating and receiving ultrasonic vibrations. The diameter of the surface 52 is the same as that of the surface 50 and also faces the duct 36 and is also orthogonal to the that duct, having a perpendicular central axis which is co-linear with the central longitudinal axis of the duct 36.

The length of the duct 36 between its flared ends is 98.5 mm, and including its flared ends it is 106.5 mm long.

Figure 2:
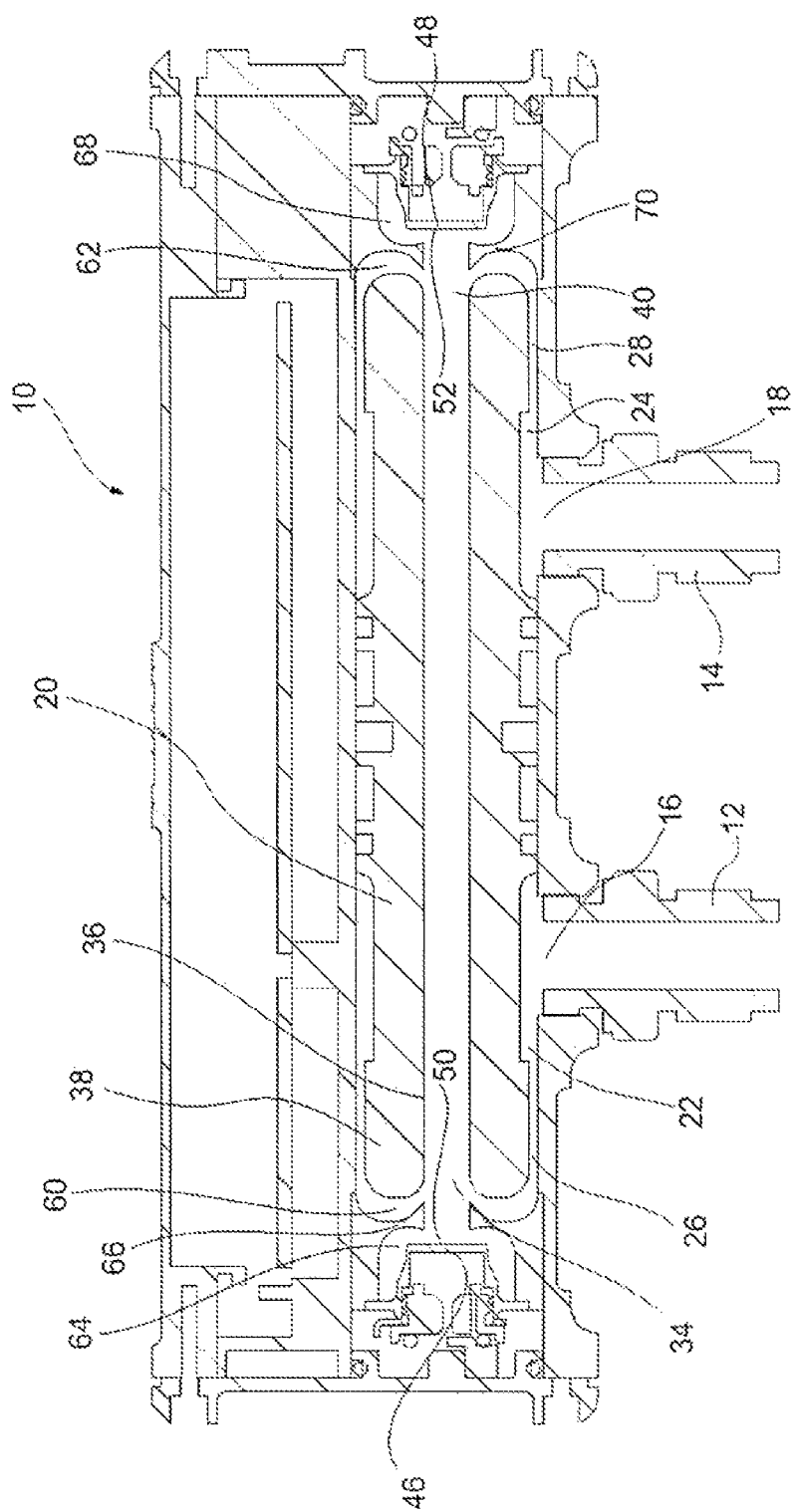
FIG. 2 shows an axial sectional view of a second embodiment of a flowmeter made in accordance with the present invention.

FIG. 2 shows a second embodiment of flowmeter made in accordance with the present invention, in which parts which correspond to parts shown in FIG. 1 have been given the same reference numerals. Where the embodiment shown in FIG. 2 differs from that shown in FIG. 1 is in the regions around the transducers 46 and 48. Thus the outer ends of the passageways 26 and 28 are in communication with the ends 34 and 40 of the duct 36 respectively by way of respective radially extending curved passageways 60 and 62. The first piezoelectric ultrasonic transducer 46 is located within a void 64 spaced from the passageway 60 by a ring 66 the cross-section of which flares towards its internal aperture, the diameter of which is equal to the cross-sectional diameter of the duct 36.

The second piezoelectric ultrasonic transducer 48 is located within a void 68 spaced from the passageway 62 by a ring 70 the cross-section of which also flares towards its internal aperture, the diameter of which is also the same as that of the internal cross-sectional diameter of the duct 36.

Figure 3:
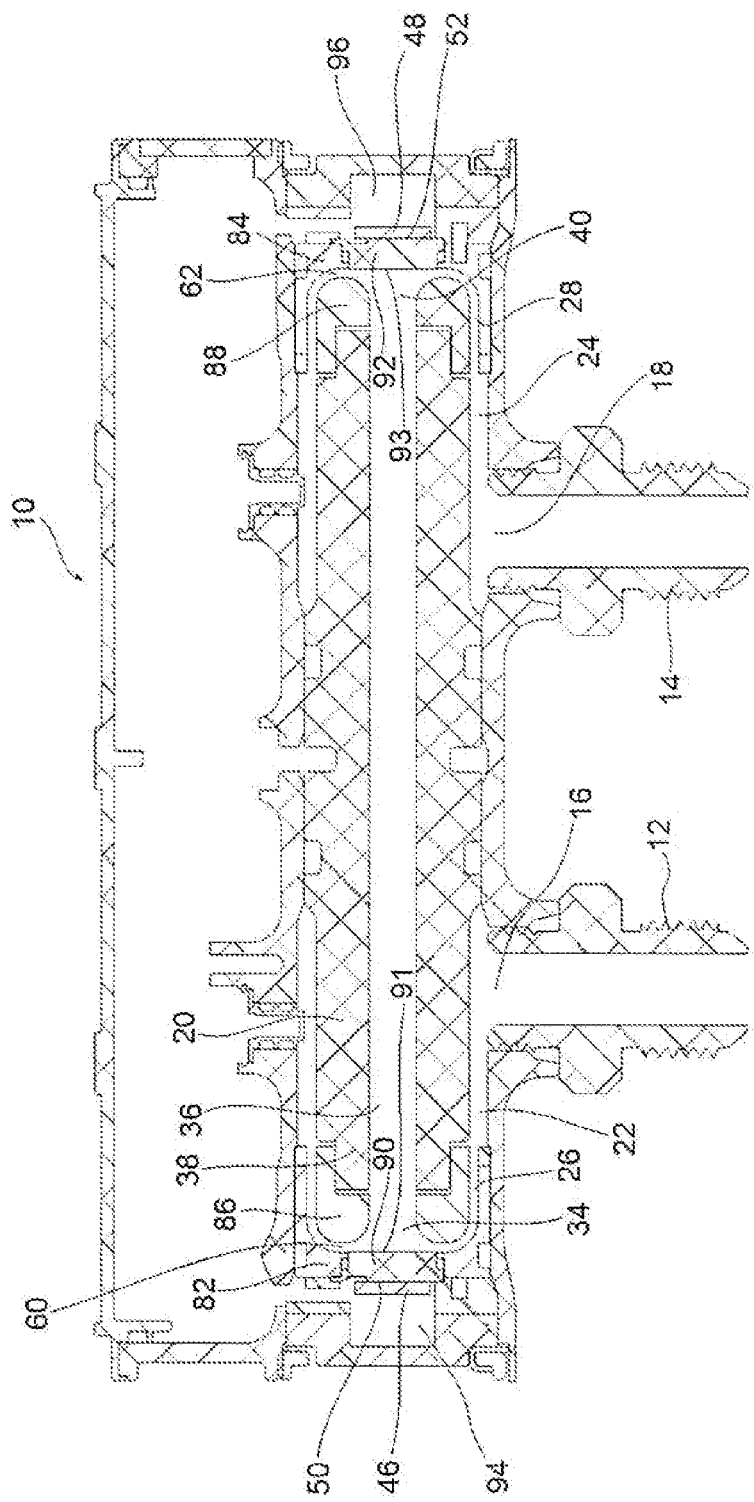
FIG. 3 shows an axial sectional view of a third embodiment of a flowmeter made in accordance with the present invention.

FIG. 3 shows a third embodiment of a flowmeter made in accordance with the present invention, in which parts which correspond to parts shown in FIGS. 1 and 2 have been given the same reference numerals. Where the embodiment shown in FIG. 3 differs from that shown in FIGS. 1 and 2 is once again in the regions around the transducers 46 and 48. Whereas the FIG. 3 embodiment is similar to the FIG. 2 embodiment in that the outer ends of the passageways 26 and 28 are in communication with the ends 34 and 40 of the duct 36 respectively by way of respective radially extending curved passageways 60 and 62, the curved passageways 60 and 62 are defined on their outsides by inner curved surfaces of annular parts 82 and 84 respectively, and on their insides by outer curved surfaces of annular parts 86 and 88 respectively. The first piezoelectric ultrasonic transducer 46 has its vibratory surface 50 attached to the rear surface of a thickness-optimised cap 90, whereby ultrasonic vibrations generated in the transducer 46 are transmitted into the fluid in the end 34 of the duct 36, via a vibration surface 91 of the cap 90 facing the duct 36 and provided for the transducer 46. The vibration surface 50 is of greater diameter than that of the cross-section of the duct 36. The vibration surface 91 is of greater diameter than that of the cross-section of the duct 36. The inner annular part 86 which has a side cross-section which is curved, guides the ultrasound vibrations into the duct 36, through the fluid within which they propagate.

At the opposite end 40 of the duct 36, the transducer 48 has its vibratory surface 52 attached to the rear surface of a thickness-optimised cap 92 through which ultrasonic vibrations present in fluid in the end 40 of the duct 36 are coupled to the transducer 48, via a vibration surface 93 of the cap 92 facing the duct 36 and provided for the transducer 48, to cause the latter to generate electrical signals accordingly. The vibration surface 52 is of greater diameter than that of the cross-section of the duct 36. The vibration surface 93 is of greater diameter than that of the cross-section of the duct 36.

Because of the symmetry of the flowmeter 10 about a transverse central plane thereof, an ultrasonic pulse generated by the transducer 48 can also transmitted through fluid in the duct 36 to be received by and to cause electrical signals to be generated within, the transducer 46.

The caps 90 and 92 are in sealing contact around their respective peripheries with the inside edges of the annular parts 82 and 84 respectively, so that the transducers 46 and 48 are both isolated from the fluid which flows through the flowmeter 10 when it is in use. Voids 94 and 96 respectively behind the transducers 46 and 48 are air-filled, and the caps 90 and 92 are therefore thick enough to withstand the pressure differential between the fluid and the air when the flowmeter is in use.

At the same time, the thickness of the caps 90 and 92 is such as to optimise the coupling of vibration between the transducers 46 and 48 and the fluid in the duct 36 when the flowmeter 10 is in use.

The thickness of the caps 90 and 92 is reduced where they meet the annular parts 82 and 84 respectively, and the latter parts are so made that they are effective as damping mountings, to reduce signal degradation owing to ringing of the caps 90 and 92.

The restricted passageways 26 and 28 in the FIG. 3 embodiment each comprise a series of channels arranged symmetrically around the circumference of the transducers 46 and 48 respectively. Each of these channels open out into the space 34 or 40 in front of the cap 90 or 92 as the case may be, and the flow through each channel is the same to ensure a symmetrical flow entering and leaving the duct 36.

Figure 4:
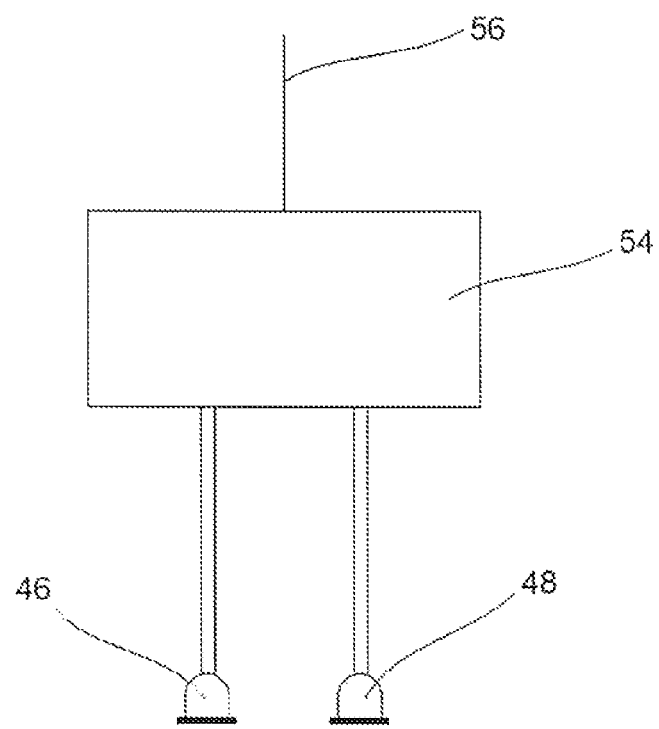
FIG. 4 shows a block circuit diagram of electronic circuitry of the flowmeter shown in each of FIGS. 1, 2 and 3.

The block circuit diagram shown in FIG. 4 shows how each transducer 46 and 48 in each of the embodiments shown in FIGS. 1, 2 and 3 is connected to receive signals from and send signals to a central processor unit 54 to provide a signal at an output 56 thereof indicative of the flow rate of fluid which passes through the flowmeter 10 when the latter is in use.

When the flowmeter 10 shown in FIG. 1 is in use, fluid the flow of which is to be measured by the flowmeter 10, for example engine fuel such as aviation fuel, petrol or diesel fuel, flows through the inlet port 12, along the annular passageway 22 and the annular passageway 26, through the radial passage 30 and into the generally conical void 32. The provides a passageway around the sides of the transducer 46.

From the void 32, the fluid continues through the end 34 into the duct 36, and right the way along that duct 36 to the other end thereof where it exits the duct 36 at its other end 40. From here it flows into the generally conical void 42, around the sides of the transducer 48 and out through the radial passageway 44 into the annular passageways 28 and 24 to the outlet port 14 through which it exits the flowmeter 10.

When the flowmeter 10 shown in FIG. 2 is in use, it operates in the same manner as the embodiment shown in FIG. 1, except that the fluid the flow of which is to be measured by the flowmeter 10, for example engine fuel such as aviation fuel, petrol or diesel fuel, which has passed through the inlet port 12 and along the annular passageway 22 and the annular passageway 26, passes into the end 34 of the duct 36 via the annular curved passageway 60. The void 64 around the sides of the transducer 46 is also filled with the fluid passing through the flowmeter 10.

Similarly for the FIG. 3 embodiment, except in this case the voids 94 and 96 behind the transducers 46 and 48 respectively are air-filled, or filled with some other gas or other low density material, and those transducers are thereby isolated from the fluid flowing through the flowmeter 10 when it is use.

The fluid continues through the duct 36 to the other end 40. From here it flows into the annular curved passageway 62. The void 68 around the sides of the transducer 48 is also filled with the fluid passing through the flowmeter 10. From the annular curved passageway 62 the fluid flows out through the radial passageway 44 into the annular passageways 28 and 24 to the outlet port 14 through which it exits the flowmeter 10.

In both the embodiments shown in FIGS. 1 and 2, whilst fluid is flowing thus through the duct 36, the central processor unit 54 issues electrical high-frequency pulses at regular intervals to the transducer 46 where the pulses are converted by the transducer 46 to ultrasonic vibrations of its surface 50 to cause ultrasonic vibrations to be transmitted from the transducer 46, and to be propagated along the fluid in the duct 36 substantially parallel thereto, to the transducer 48. Here the ultrasonic vibrations in the fluid are converted by the transducer 48 to electronic pulses which are received by the central processor unit 54. The latter is constructed and programmed to compare the delay in the time between the emission of a pulse by the transducer 46 and the reception of a corresponding pulse by the transducer 48 with the delay in the time between the emission of a pulse by the transducer 48 and the reception of the pulse by the transducer 46 whilst fluid is flowing at the same rate through the flowmeter 10. From these values the central processor unit 54 is so programmed to provide an output signal at its output 56 which is indicative of the flowrate of the fluid through the duct 36, and hence to provide a signal indicative of the flowrate of fluid into and out of the inlet and outlet ports 12 and 14. From the values of the cross-sectional diameter of the inlet port 12 and the outlet port 14, it may also provide a signal indicative of the average speed of flow of fluid therethrough.

The foregoing constructions of flowmeter have a low sensitivity to turbulence variation with flow rate changes. They provide a fast response time, are compact in form and are resistant to outside interference.

Because the flowmeter 10 is reflection symmetrical about a central transverse plane thereof in each of the embodiments shown in FIGS. 1, 2 and 3, in each embodiment the function of the inlet 12 and the outlet 14 can be readily swapped, so that the function of what is referred to herein as the inlet 12 is changed so that it becomes the outlet, and the function of what is referred to herein as the outlet 14 is changed so that it becomes the inlet.

Numerous variations and modifications to the illustrated flowmeter 10 may occur to the reader without taking the resulting construction outside the scope of the present invention. To give one example only, it would be possible to have the inlet port 12 and outlet port 14 at respective ends of the block 20 so that their respective axes are in alignment with that of the duct 36, provided sufficient means are provided to reduce turbulence within the fluid.

What is claimed is:

1. An ultrasonic flowmeter comprising an elongate duct through which fluid flows when the flowmeter is in use, ultrasonic transducers arranged respectively to transmit and receive ultrasonic pulses propagated through such fluid when the flowmeter is in use, and electronic circuitry connected to the transducers to provide a measure of the time delay between emission of an electronic pulse from one of the transducers and reception of the pulse by the other of the transducers, and constructed to enable an output to be provided which is dependent upon that delay and which is indicative of the rate of flow of fluid through the duct, in which the transducers are located respectively at opposite ends of the duct and are arranged to transmit and receive ultrasonic pulses propagated through the fluid substantially parallel to the duct from one end thereof to the other, wherein the transducers are provided with respective vibratory surfaces which transmit and/or receive ultrasound, which vibratory surfaces have a diameter which exceeds the cross-sectional diameter of the duct.

2. An ultrasonic flowmeter according to claim 1, wherein both transducers are isolated from fluid which flows through the flowmeter when the latter is in use.

3. An ultrasonic flowmeter according to claim 2, wherein such isolation is effected by respective caps to which the transducers are acoustically coupled.

4. An ultrasonic flowmeter according to claim 1, wherein fluid which flows through the flowmeter when it is in use is in contact with that side of each cap which is further from the associated transducer, the transducers being in respective cavities filled with low density material.

5. An ultrasonic flowmeter according to claim 1, wherein the thickness of the caps is such as to optimise coupling between the transducers and such fluid.

6. An ultrasonic flowmeter according to claim 1, wherein the caps are mounted in or on damping mountings to reduce signal degradation owing to ringing of the caps.

7. An ultrasonic flowmeter according to claim 1, wherein both transducers are constructed to both transmit and receive ultrasonic pulses, and the electronic circuitry is such as to enable the flowmeter to operate by transmitting and receiving ultrasonic pulses which pass within the fluid from one transducer to the other in the direction of flow of fluid, and also in the opposite direction, and to enable the difference in transmission time between pulses transmitted in the direction of flow and those transmitted opposite to the direction of flow to be used to calculate the rate of flow of fluid through the duct.

8. An ultrasonic flowmeter according to claim 1, wherein there is a circular symmetry in the construction of the flowmeter at the transducers.

9. An ultrasonic flowmeter according to claim 1, wherein there is a reflection symmetry in the construction of the flowmeter about a central transverse plane thereof.

10. An ultrasonic flowmeter according to claim 1, wherein the flowmeter is provided with an input aperture and an output aperture through which fluid flows when the flowmeter is in use, the diameters of the input and output apertures being substantially equal, but being larger than the cross-sectional diameter of the duct.

11. An ultrasonic flowmeter according to claim 1, wherein the flowmeter is provided with input and output apertures which are located laterally of the duct, between the ends of the duct, and the flowmeter is provided with fluid-flow passageways from the inlet aperture to one end of the duct, and from the other end of the duct to the outlet aperture.

12. An ultrasonic flowmeter according to claim 1, wherein the flowmeter is constructed so that the diameter of the duct is substantially five wavelengths of the ultrasound transmitted by the transducers or at least one of the transducers, being the wavelength of the ultrasound as transmitted within the fluid the flow of which is to be measured.

13. An ultrasonic flowmeter according to claim 1, wherein the material which defines the duct is such that it absorbs ultrasound, as transmitted by the transducers or at least one of the transducers, having an angle of incidence to the material which is less than a predetermined angle, but reflects such ultrasound having an angle of incidence to the material which is greater than a predetermined angle.

14. An ultrasonic flowmeter according to claim 1, wherein the duct is cylindrical and of uniform cross-section.

15. An ultrasonic flowmeter according to claim 1, wherein the duct is defined by material the internal walls of which have a relief pattern to achieve the desired absorption/reflection properties of the walls of the duct.

16. An ultrasonic flowmeter according to claim 1, wherein the ratio of the length of the duct to its cross-section diameter is in the range from 20 to 30.

17. An ultrasonic flowmeter according to claim 16, wherein the diameter of the duct is substantially 5.0 mm, and the spacing between the transducers is substantially 113 mm.

18. An ultrasonic flowmeter according to claim 1, wherein the speed of sound through the material which defines the duct is greater than the speed of sound through the fluid which flows through the flowmeter when the latter is in use, and the density of that material is greater than the density of the fluid which flows through the flowmeter when the latter is in use.

19. An ultrasonic flowmeter according to claim 18, wherein the said material comprises glass filled polytetrafluoroethylene (PTFE).

20. A method of measuring the flow of fluid using a flowmeter as claimed in claim 1.

* * * * *